(12) United States Patent
Hsu et al.

(10) Patent No.: US 8,638,530 B1
(45) Date of Patent: Jan. 28, 2014

(54) CURRENT-PERPENDICULAR-TO-THE-PLANE (CPP) MAGNETORESISTIVE (MR) SENSOR HAVING A TOP SHIELD WITH AN ANTIPARALLEL STRUCTURE

(71) Applicant: HGST Netherlands B.V., Amsterdam (NL)

(72) Inventors: Yimin Hsu, Sunnyvale, CA (US); Stefan Maat, San Jose, CA (US); Arley Cleveland Marley, San Jose, CA (US); Alexander M. Zeltser, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/771,486

(22) Filed: Feb. 20, 2013

(51) Int. Cl.
*G11B 5/39* (2006.01)
*G11B 5/11* (2006.01)

(52) U.S. Cl.
USPC .................. 360/319; 360/324.1; 360/324.2

(58) Field of Classification Search
USPC .......... 360/319, 324.1, 324.11, 324.12, 324.2
See application file for complete search history.

(56) References Cited

U.S. PATENT DOCUMENTS

| | | | |
|---|---|---|---|
| 6,456,467 B1 | 9/2002 | Mao et al. | |
| 6,801,409 B2 | 10/2004 | Michel et al. | |
| 7,248,449 B1 | 7/2007 | Seagle | |
| 7,800,867 B2 | 9/2010 | Saito et al. | |
| 2002/0064002 A1* | 5/2002 | Gill | 360/319 |
| 2007/0201166 A1* | 8/2007 | Gill | 360/319 |
| 2009/0279213 A1* | 11/2009 | Wu et al. | 360/319 |
| 2010/0067148 A1* | 3/2010 | Tsuchiya et al. | 360/245.3 |

* cited by examiner

*Primary Examiner* — Jefferson Evans
(74) *Attorney, Agent, or Firm* — Thomas R. Berthold (57) ABSTRACT

A current-perpendicular-to-the-plane magnetoresistive sensor structure includes at least an improved top shield structure and optionally also a similar bottom shield structure. The top shield structure includes an antiparallel structure (APS) of two ferromagnetic films and a nonmagnetic antiparallel coupling (APC) film between them. The APC film induces antiferromagnetic (AF) coupling between the two ferromagnetic films so that they have their respective magnetizations oriented antiparallel. An important aspect of the APS is that there is no antiferromagnetic layer adjacent the upper ferromagnetic film, so that the upper ferromagnetic film does not have its magnetization pinned by an antiferromagnetic layer. An electroplated shield layer is formed above the APS. A nonmagnetic decoupling layer is located between the APS and the electroplated shield layer to prevent domain wall movement in the electroplated shield from transferring to the ferromagnetic layers in the APS and thus possibly induce noise in the sensor.

18 Claims, 5 Drawing Sheets

CURRENT-PERPENDICULAR-TO-THE-PLANE (CPP) MAGNETORESISTIVE (MR) SENSOR HAVING A TOP SHIELD WITH AN ANTIPARALLEL STRUCTURE

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to CPP-MR sensor with improved magnetic shields.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed parallel to the plane of the layers in the sensor stack the sensor is referred to as a current-in-plane (CIP) sensor. If the sense current is directed perpendicularly through the planes of the layers in the sensor stack, the sensor is referred to as a current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-GMR read head the nonmagnetic spacer layer is formed of an electrically conductive material, typically a metal such as Cu or Ag. In a CPP-TMR read head the nonmagnetic spacer layer is formed of an electrically insulating material, such as $TiO_2$, MgO or $Al_2O_3$.

The sensor stack in a CPP-MR read head is located between two shields of magnetically permeable material that shield the read head from recorded data bits that are neighboring the data bit being read. As the data density increases in magnetic recording disk drives, the read head dimensions decrease. In particular, the flux from the neighboring bits in the along-the-track direction as well as from bits in adjacent tracks needs to be shielded to improve the spatial resolution of the sensor. During a read operation, the shields ensure that the sensor reads only the information from the bit stored directly beneath it on a specific track of the disk by absorbing any stray magnetic fields emanating from adjacent bits and adjacent tracks. In each shield there can be a large number of magnetic domains separated from each other by domain walls. The application of an external magnetic field, such as from bits in adjacent tracks or adjacent bits in the track being read, can cause these magnetic domain walls to move. The overall result is undesirable noise during the read operation.

What is needed is a CPP-MR sensor with improved magnetic shields that reduce noise in the sensor during read operations.

SUMMARY OF THE INVENTION

This invention is directed to a CPP-MR sensor structure with at least an improved top shield structure and optionally also a similar bottom shield structure. The top shield structure includes an antiparallel structure (APS) of two ferromagnetic films and a nonmagnetic antiparallel coupling (APC) film between them. The APC film induces antiferromagnetic (AF) coupling between the two ferromagnetic films so that they have their respective magnetizations oriented antiparallel. An important aspect of the APS is that there is no antiferromagnetic layer adjacent to the upper ferromagnetic film, so that the upper ferromagnetic film does not have its magnetization pinned by an antiferromagnetic layer. An electroplated shield layer is formed above the APS. A nonmagnetic decoupling layer is located between the APS electroplated shield layer. The nonmagnetic decoupling layer is preferably Ru or a NiCr alloy, but may be any nonmagnetic material with a thickness sufficient to magnetically decouple the electroplated shield layer from the APS so that domain wall movement in the electroplated shield layer does not transfer to the ferromagnetic layers in the APS and thus possibly induce noise in the sensor. Sensors with the shield structure according to the invention exhibit transfer curves (i.e., the curve of resistance vs. external excitation field) with no hysteresis, which means the change in resistance in response to the external magnetic field will not depend on the previous history.

For a fuller understanding of the nature and advantages of the present invention, reference should be made to the following detailed description taken together with the accompanying figures.

DETAILED DESCRIPTION OF THE INVENTION

Figure 1:
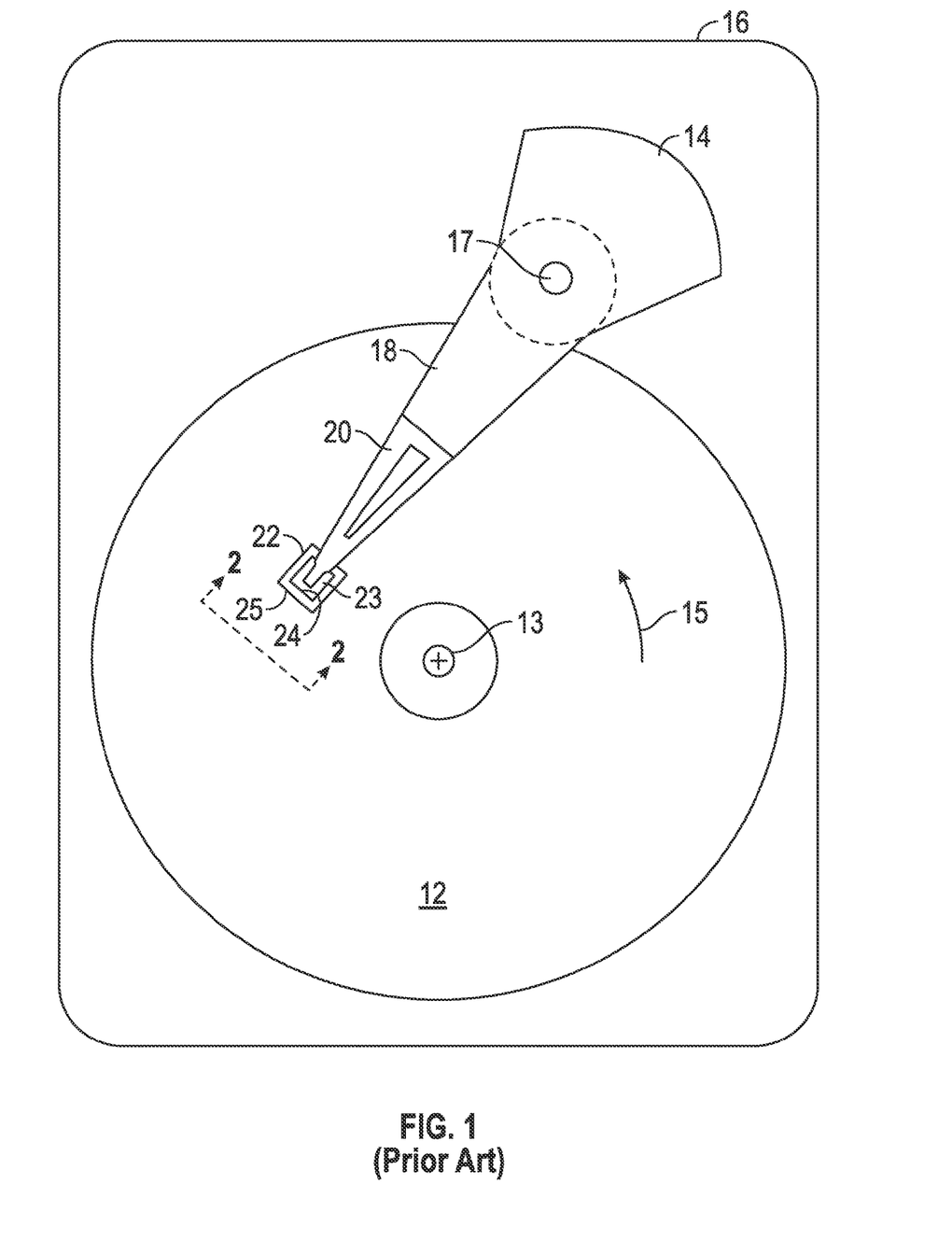
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
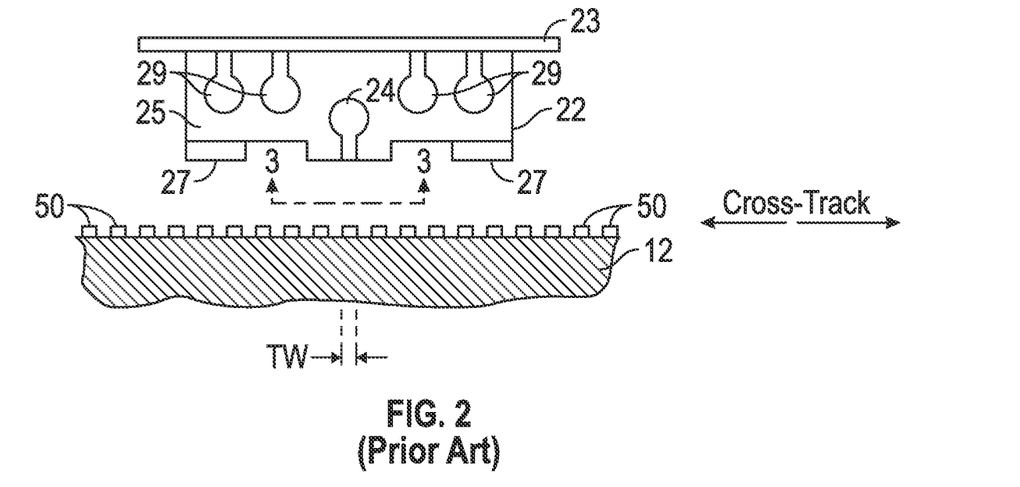
FIG. 2 is an enlarged end view of the slider and a section of the disk taken in the direction 2-2 in FIG. 1 according to the prior art.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
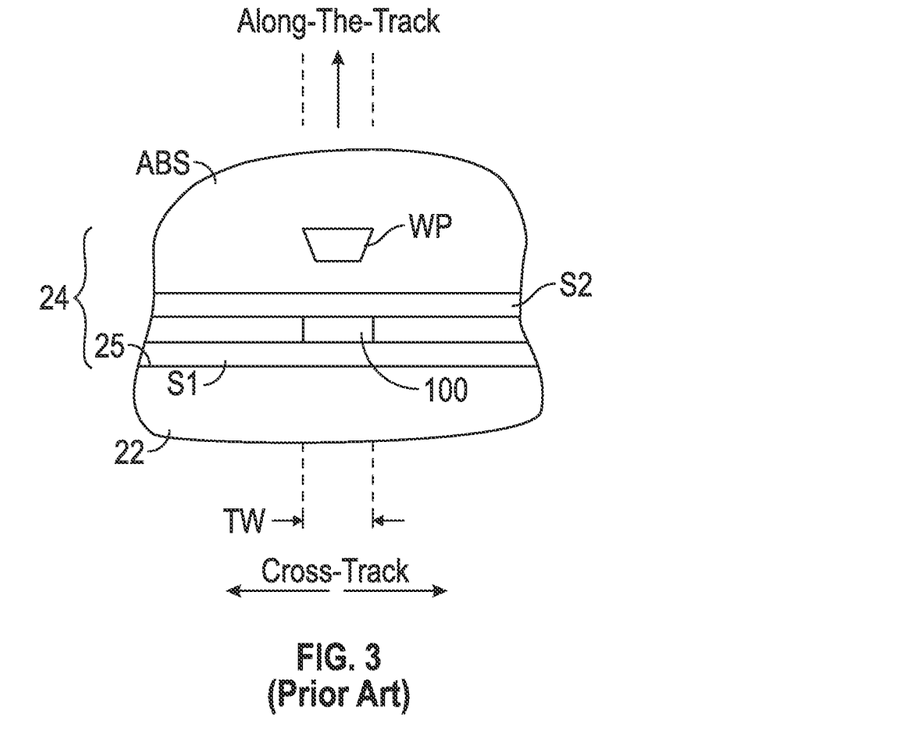
FIG. 3 is a view in the direction 3-3 of FIG. 2 and shows the ends of the read/write head as viewed from the disk according to the prior art.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of magnetically permeable material and are also be electrically conductive so they can function as the electrical leads to the read head 100. The shields function to shield the read head 100 from recorded data bits that are neighboring the data bit being read. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
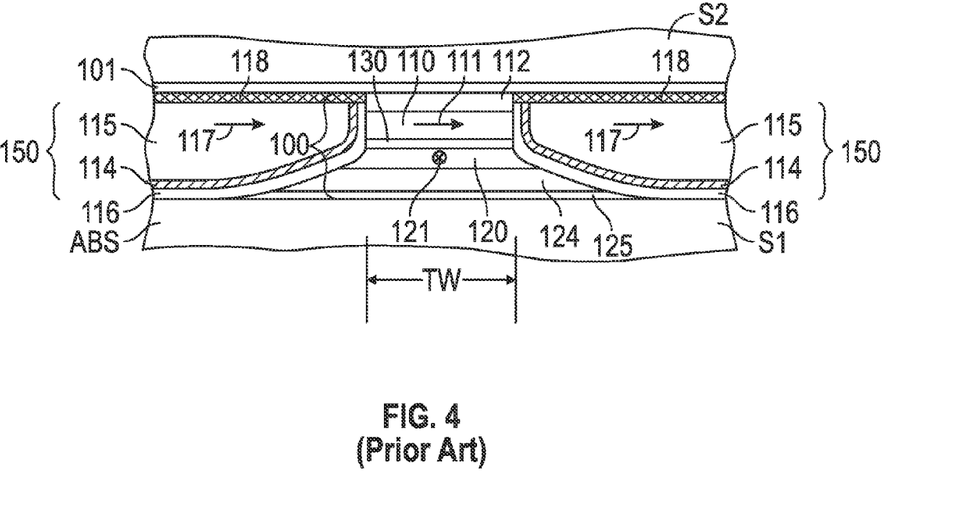
FIG. 4 is a cross-sectional schematic view of a prior art CPP-MR read head showing the stack of layers located between the magnetic shield layers.

FIG. 4 is view of the ABS showing the layers making up a prior art CPP-MR sensor structure as would be viewed from the disk. Sensor 100 is a CPP-MR read head comprising a stack of layers formed between the two magnetic shield layers S1, S2. The sensor 100 has a front edge at the ABS and spaced-apart side edges that define the track width (TW). The shields S1, S2 are typically electroplated and formed of electrically conductive material and thus also function as electrical leads for the sense current, which is directed generally perpendicularly through the layers in the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2.

The sensor 100 layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and a nonmagnetic spacer layer 130 between the reference layer 120 and free layer 110. The CPP-MR sensor 100 may be a CPP GMR sensor, in which case the nonmagnetic spacer layer 130 would be formed of an electrically conducting material, typically a metal like Cu or Ag. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, $MgO$ or $Al_2O_3$. The reference layer 120 may have its magnetization direction pinned by being exchange-coupled to an antiferromagnetic (AF) layer 124. The AF layer 124 is typically a Mn alloy, e.g., PtMn, NiMn, FeMn, IrMn, PdMn, PtPdMn or RhMn. A seed layer 125 may be located between the lower shield layer S1 and the AF layer 124 to enhance the growth of the AF layer 124. The seed layer 125 is typically one or more layers of NiCr, NiFe, Ta, Cu, or Ru. A capping layer 112 is located between the free ferromagnetic layer 110 and the upper shield layer S2. The capping layer 112 provides corrosion protection and may be a single layer or multiple layers of different materials, such as Ru, Ta, Ti, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 121 of reference layer 120 will remain fixed and not rotate. Thus when a sense current is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 121, which is detectable as a change in electrical resistance.

A hard magnet biasing structure 150 is formed outside of the sensor stack near the side edges of the sensor 100, particularly near the side edges of free layer 110. The structure 150 includes a ferromagnetic biasing layer 115 with high crystalline anisotropy ($K_u$) and thus high coercivity ($H_c$), like a CoPtCr alloy, and is thus also called the "hard bias" layer. The structure 150 also includes a seed layer 114 below the biasing layer 115, an insulating layer 116 below the seed layer 114 and a capping layer 118 on the biasing layer 115. The seed layer 114 and biasing layer 115 are electrically insulated from side edges of sensor 100 by electrically insulating layer 116, which is typically alumina ($Al_2O_3$) but may also be a silicon nitride ($SiN_x$) or another metal oxide like a Ta oxide or a Ti oxide. The shield layer S1 serves as a substrate for the hard biasing structure 150. The seed layer 114 is deposited on the insulating layer 116. The biasing layer 115 has a magnetization 117 generally parallel to the ABS and thus longitudinally biases the magnetization 111 of the free layer 110.

Thus in the absence of an external magnetic field the magnetization 117 of biasing layer 115 is parallel to the magnetization 111 of the free layer 110.

During a read operation, the thick electroplated top (S2) and bottom (S1) shields ensure that the sensor reads only the information from the bit stored directly beneath it on a specific track of the disk by absorbing any stray magnetic fields emanating from adjacent bits and adjacent tracks. In each shield there can be a large number of magnetic domains separated from each other by domain walls. Each domain typically has a magnetization oriented in a direction different from the magnetization of adjacent domains. The application of an external magnetic field, such as from an adjacent track or adjacent bits in the track being read, can cause the domain walls to move. Because of the random nature of the domain wall location, the domain walls generally do not return to their original location after the external magnetic field is removed. The shields exert stray magnetic fields on the sensor, which are accounted for because the sensor is biased. However, as the domain walls move, these stray magnetic fields change, thus changing the bias point of the sensor, as well as the response of the sensor to signals emanating from the disk. The overall result is undesirable noise during the read operation.

In addition to the conventional electroplated top and bottom shields as described above with respect to FIG. 4, there have been various types of alternative shield structures proposed in the prior art. One proposal, as described in U.S. Pat. No. 6,801,409 B2, uses multiple ferromagnetic/antiferromagnetic bilayers, where each ferromagnetic layer is required to have its magnetization pinned by an antiferromagnetic layer. Another proposal, as described in U.S. Pat. No. 6,456,467 B2, uses multiple stacked antiparallel coupled structures without an electroplated layer, where each antiparallel coupled structure is two ferromagnetic layers antiferromagnetically coupled across a nonmagnetic spacer layer.

Figure 5:
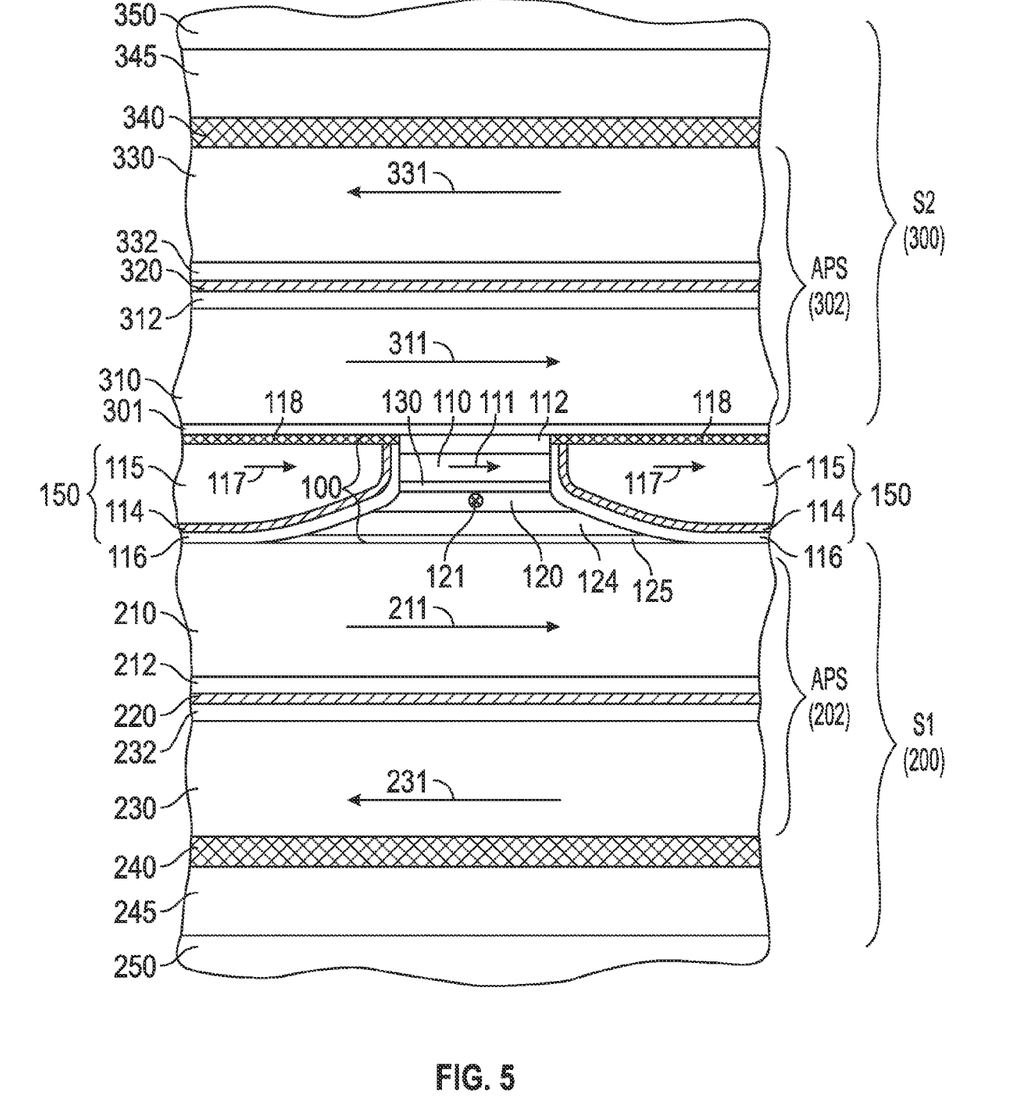
FIG. 5 is a cross-sectional schematic view of the CPP-MR read head with the top and bottom magnetic shields according to the invention.

This invention is directed to a CPP-MR sensor structure with improved top and bottom magnetic shield structures. FIG. 5 is a view of the ABS showing the layers making up the CPP-MR sensor structure according to the invention as would be viewed from the disk. The sensor 100 and hard magnet biasing structure 150 are as described above but are located between bottom shield structure S1 (200) and top shield structure S2 (300). In this invention the CPP-MR sensor structure includes at least the top shield structure 300 and optionally also the bottom shield structure 200.

The top shield structure 300 includes an antiparallel structure (APS) 302 adjacent the sensor 100. The APS 302 may be formed on a first seed layer 301, which may be for example a Ru film with a thickness between about 10 to 40 Å. The APS 302 includes a first ferromagnetic film 310, a second ferromagnetic film 330 and a nonmagnetic antiparallel coupling (APC) film 320 between first and second films 310, 330. The films 310, 330 are preferably formed of a NiFe alloy wherein Ni is present in said alloy in an amount between 70 and 90 atomic percent (at. %). Alternatively films 310, 330 may be formed of other soft ferromagnetic materials like NiFeCr, NiFeMo, CoZrTa, CoZrNb or CoFeZr. The APC film 320 is typically Ru, Ir, Rh, Cr or alloys thereof with a thickness sufficient to induce antiferromagnetic (AF) coupling between the films 310, 330, for example a thickness between about 7-12 Å. As a result of the antiferromagnetic coupling across APC film 320 the films 310, 330 have their respective magnetizations 311, 331 oriented antiparallel. The magnetization 311 of first ferromagnetic film 310 is set during manufacturing when the magnetization 117 of hard bias layer 115 is set. When the magnetization 311 of film 310 becomes oriented parallel to the magnetization 117 of hard bias layer 115, the magnetization 331 of film 330 becomes oriented antiparallel due to the antiferromagnetic coupling across APC film 320. A first optional ferromagnetic interface film 312 may be formed between first ferromagnetic film 310 and APC film 320. Similarly, a second optional ferromagnetic interface film 332 may be formed between second ferromagnetic film 330 and APC film 320. The optional ferromagnetic interface layers 312, 332 may be formed of a CoFe alloy with a thickness between about 4 to 12 Å, typically with a preferred Fe concentration in atomic percent (at. %) between about 0 to 50 at. % when Ru is used for the APC, and an Fe concentration of preferably between about 80 to 100 at. % when Cr is used for the APC. The ferromagnetic films 310, 330 may each have a thickness between about 200 to 400 Å, so the total thickness of APS 302 is between about 420 to 820 Å. An important aspect of the APS 302 is that there is no antiferromagnetic layer adjacent second ferromagnetic film 330, so that film 330 does not have its magnetization 331 pinned by an antiferromagnetic layer.

The magnetic shield structure S2 includes an electroplated shield layer 350 that is formed above APS 302. The shield layer 350 is also preferably formed of an alloy comprising Ni and Fe with Ni between about 70 to 90 at. % and is electroplated to a thickness between about 0.5 to 2 microns. Shield layer 350 may also be formed of other soft magnetic materials, such as NiFeCr or NiFeMo alloys.

A necessary feature of the invention, discovered during testing of various types of shield structures, is the need for a nonmagnetic decoupling layer 340 between electroplated shield layer 350 and the APS 302. This nonmagnetic layer is preferably Ru or a non-magnetic NiCr alloy with a thickness between about 25 to 40 Å for Ru and 10 to 40 Å for NiCr, but may be any nonmagnetic material with a thickness sufficient to magnetically decouple electroplated shield layer 350 from APS 302 so that domain wall movement in layer 350 does not transfer to the ferromagnetic layers in APS 302 and thus possibly induce noise in the sensor 100. An optional second seed layer 345, such as a NiFe alloy or other soft magnetic alloy such as NiFeCr or NiFeMo, may be formed on decoupling layer 340 to facilitate the electroplating of shield layer 350. The second seed layer 345, like all the layers of shield structure 300 below it, is typically formed by sputter deposition.

Figure 6:
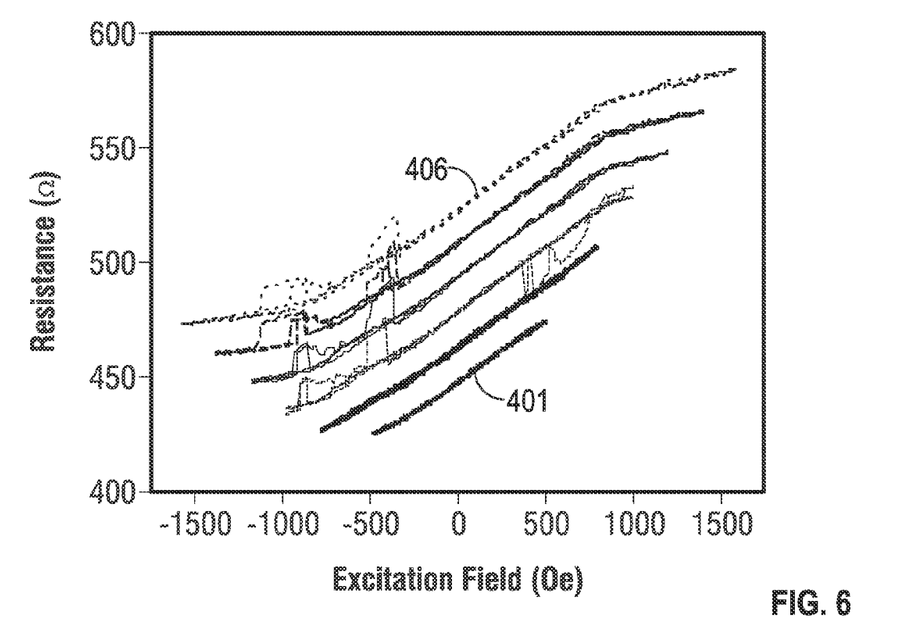
FIG. 6. is a set of transfer curves for sensors with prior art electroplated shields exhibiting higher hysteresis with increasing excitation field.

Ideally when a sensor is excited by an external magnetic field its transfer curve (i.e., the curve of resistance vs. external excitation field) is not hysteretic, which means the change in resistance in response to the external magnetic field will not depend on the previous history. Hence, the transfer curve should fall on a line. However, for prior art electroplated shield structures, hysteresis is observed as shown in FIG. 6. In FIG. 6, the excitation field was applied perpendicular to the ABS for sensors with no longitudinal biasing field. Hysteresis in the transfer curve is measured as any open area for a full transfer curve as the field is swept from full positive to full negative and back to full positive field excitation. The set of lines are for increasing maximum excitation field range, i.e., from a negative field to a positive field, with lowest line 401 being for an excitation field from +250 Oe to −250 Oe and highest line 406 being for an excitation field from +1500 Oe to −1500 Oe. The amount of hysteresis increases as the excitation field is increases.

Figure 7:
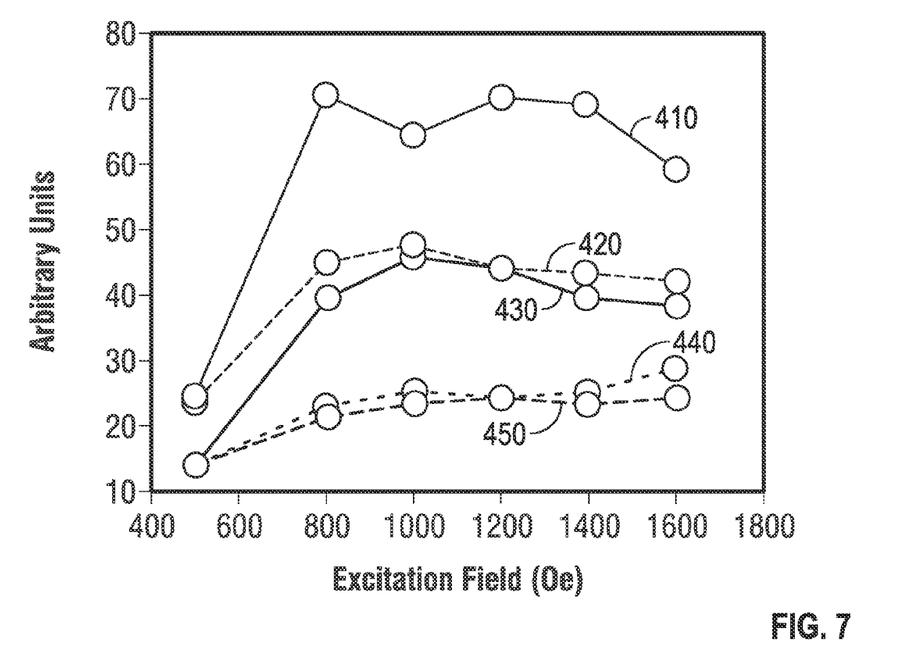
FIG. 7 is a graph comparing transfer curve hysteresis range for the 5% worst parts for sensors with various shield structures, including the shield structure according to the invention.

The improvement made by the invention will be explained with respect to FIG. 7. FIG. 7 is a showing of the transfer curve hysteresis range (in arbitrary units) of the 5% worst parts from a sample of several hundred parts as a function of external excitation field for various types of top magnetic shield structures. The data for line 410 is for a conventional prior art top shield of electroplated NiFe. The data for lines 420, 430 is for a shield structure where a thick (~1 micron) electroplated NiFe layer 350 is directly plated on top of APS 302 without decoupling layer 340. The data for lines 440, 450 is for a shield structure according to the invention where decoupling layer 340 and seed plating layer 345 are formed between a thick (~1 micron) electroplated NiFe layer 350 and APS 302. As can be clearly seen from FIG. 7, the top magnetic shield structures according to the invention (lines 440, 450) with the nonmagnetic decoupling layer exhibit the lowest amount of transfer curve hysteresis for the 5% worst parts. This is particularly apparent for excitation fields of 800 Oe and higher. While the APS 302 structure acts as the top shield it is desirable to keep the thick top plated shield 350 so as not to change the thermal and air-bearing properties for the ABS.

Referring again to FIG. 5, the CPP-MR sensor structure according to the invention may optionally include a bottom shield structure S1 (200) like top shield structure S2 (300), but with the order of the layers reversed. The bottom shield structure 200 includes an antiparallel structure (APS) 202 adjacent the sensor 100. The APS 202 includes a first ferromagnetic film 210 below seed layer 125, a second ferromagnetic film 230 and a nonmagnetic antiparallel coupling (APC) film 220 between first and second films 210, 230. The magnetization 211 of first ferromagnetic film 210 is set during manufacturing when the magnetization 117 of hard bias layer 115 is set. When the magnetization 211 of film 210 becomes oriented parallel to the magnetization 117 of hard bias layer 115, the magnetization 231 of film 230 becomes oriented antiparallel due to the antiferromagnetic coupling across APC film 220. A first optional ferromagnetic interface film 212 may be formed between first ferromagnetic film 210 and APC film 220. Similarly, a second optional ferromagnetic interface film 232 may be formed between second ferromagnetic film 230 and APC film 220. Like the top APS 302, the bottom APS 202 does not require an antiferromagnetic layer to pin the magnetization of second ferromagnetic film 230.

The magnetic shield structure S1 (202) includes an electroplated shield layer 250. The nonmagnetic decoupling layer 240 is deposited on electroplated shield layer 250, or on an optional seed layer 245, which may be formed of NiFe. The APS 202 is formed on decoupling layer 240 or optional seed layer 245.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A current-perpendicular-to-the-plane (CPP) magnetoresistive sensor structure comprising:
   a substrate;
   a bottom magnetic shield on the substrate;
   a magnetoresistive sensor on the bottom magnetic shield; and
   a top magnetic shield on the sensor, the top magnetic shield comprising
      an antiparallel structure (APS) on the sensor, the APS having first and second ferromagnetic films and an antiparallel coupling (APC) film between said first and second ferromagnetic films that couples said first and second ferromagnetic films together antiferromagnetically, whereby said first and second ferromagnetic films have substantially antiparallel magnetization directions;
      a nonmagnetic decoupling layer on said second ferromagnetic film of the APS, wherein there is no antiferromagnetic layer in the APS for pinning the magnetization direction of said second antiferromagnetic film; and
      an electroplated shield layer on the decoupling layer.

2. The sensor structure of claim 1 wherein each of the first and second ferromagnetic APS films is formed of an alloy comprising Ni and Fe wherein Ni is present in said alloy in an amount between 70 and 90 atomic percent.

3. The sensor structure of claim 1 wherein each of the first and second ferromagnetic APS films is formed from an alloy selected from an alloy comprising Ni, Fe and Cr, an alloy comprising Ni, Fe and Mo, and an alloy comprising Co, Zr and one of Fe, Nb and Ta.

4. The sensor structure of claim 1 further comprising a first ferromagnetic interface film between the first ferromagnetic APS film and the APC film, and a second ferromagnetic interface film between the second ferromagnetic APS film and the APC film.

5. The sensor structure of claim 4 wherein each of the first and second ferromagnetic interface films is formed of an alloy comprising Co and Fe.

6. The sensor structure of claim 1 wherein the nonmagnetic decoupling layer is formed of a material selected from Ru and an alloy comprising Ni and Cr.

7. The sensor structure of claim 1 wherein the electroplated shield layer is formed of an alloy comprising Ni and Fe wherein Ni is present in said alloy in an amount between 70 and 90 atomic percent.

8. The sensor structure of claim 1 further comprising a first seed layer between the sensor and the APS.

9. The sensor structure of claim 1 further comprising a second seed layer between the nonmagnetic decoupling layer and the electroplated shield layer.

10. The sensor structure of claim 1 wherein the bottom shield comprises:
    an antiparallel structure (APS), the APS having first and second ferromagnetic films and an antiparallel coupling (APC) film between said first and second ferromagnetic films that couples said first and second ferromagnetic films together antiferromagnetically, whereby said first and second ferromagnetic films have substantially antiparallel magnetization directions;
    an electroplated shield layer; and
    a nonmagnetic decoupling layer between the APS and the electroplated shield layer.

11. The sensor structure of claim 1 wherein the magnetoresistive sensor is a tunneling magnetoresistive sensor.

12. The sensor structure of claim 1 wherein the magnetoresistive sensor is a giant magnetoresistive sensor.

13. A current-perpendicular-to-the-plane (CPP) magnetoresistive (MR) read head for reading magnetically recorded data from tracks on a magnetic recording disk in a disk drive, the head comprising:
    an air-bearing slider having an air-bearing surface (ABS) for facing the disk and a trailing surface generally orthogonal to the ABS;
    a bottom magnetic shield on the trailing surface;
    a magnetoresistive sensor on the bottom magnetic shield; and
    a top magnetic shield on the sensor, the top magnetic shield comprising
       an antiparallel structure (APS) on the sensor, the APS having lower and upper ferromagnetic films and an antiparallel coupling (APC) film between said lower and upper ferromagnetic films that couples said lower and upper ferromagnetic films together antiferromagnetically, whereby said lower and upper ferromagnetic films have substantially antiparallel magnetization directions, and wherein there is no antiferromagnetic layer in the APS for pinning the magnetization direction of said second antiferromagnetic film;

an electroplated shield layer; and a nonmagnetic layer between the APS and the electroplated shield layer and having a thickness sufficient to magnetically decouple the electroplated shield layer from the APS.

14. The head of claim 13 wherein the nonmagnetic layer is formed of a material selected from Ru and an alloy comprising Ni and Cr.

15. The head of claim 13 wherein the electroplated shield layer is formed of an alloy comprising Ni and Fe wherein Ni is present in said alloy in an amount between 70 and 90 atomic percent and has a thickness between 0.5 and 2.0 microns.

16. The head sensor of claim 13 wherein the bottom shield comprises:

an electroplated shield layer on the trailing surface;

an antiparallel structure (APS), the APS having first and second ferromagnetic films and an antiparallel coupling (APC) film between said first and second ferromagnetic films that couples said first and second ferromagnetic films together antiferromagnetically, whereby said first and second ferromagnetic films have substantially antiparallel magnetization directions; and a nonmagnetic layer between the electroplated shield layer and the APS and having a thickness sufficient to magnetically decouple the electroplated shield layer from the APS.

17. The head of claim 13 wherein the magnetoresistive sensor is a tunneling magnetoresistive sensor.

18. The head of claim 13 wherein the magnetoresistive sensor is a giant magnetoresistive sensor.

* * * * *